United States Patent [19]
Scheckenbach

[11] Patent Number: 5,852,139
[45] Date of Patent: Dec. 22, 1998

[54] MIXTURES OF THERMOPLASTICS AND OXIDIZED POLYARLENE SULFIDES

[75] Inventor: Di Helmut Scheckenbach, Langen, Germany

[73] Assignee: Ticona GmbH, Frankfurt am Main, Germany

[21] Appl. No.: 833,682

[22] Filed: Apr. 8, 1997

[30] Foreign Application Priority Data

Apr. 9, 1996 [DE] Germany .................. 196 13 979.1

[51] Int. Cl.$^6$ .......................... C08F 283/00; C08L 81/00
[52] U.S. Cl. .......................... 525/537; 525/55; 525/132; 525/150; 525/390; 525/398; 525/410; 525/417; 525/420; 525/453; 525/461; 525/462; 525/474; 525/534; 525/535; 525/906; 525/931; 525/471
[58] Field of Search ........................ 525/437, 55, 132, 525/150, 390, 398, 410, 417, 420, 453, 461, 462, 471, 474, 534, 535, 537, 906, 931

[56] References Cited

U.S. PATENT DOCUMENTS

| | | | |
|---|---|---|---|
| 3,717,620 | 2/1973 | Rohlfing | 528/388 |
| 4,645,826 | 2/1987 | Iizuka et al. | 528/388 |
| 5,049,446 | 9/1991 | Blackwell et al. | 428/364 |
| 5,496,916 | 3/1996 | Fleischer et al. | 528/373 |
| 5,496,917 | 3/1996 | Fleischer et al. | 528/373 |
| 5,670,569 | 9/1997 | Scheckenbach et al. | 524/500 |
| 5,708,089 | 1/1998 | Scheckenbach et al. | 525/189 |
| 5,716,999 | 2/1998 | Frank et al. | 521/77 |

FOREIGN PATENT DOCUMENTS

| | | |
|---|---|---|
| 0 266 791 | 5/1988 | European Pat. Off. . |
| 0 388 969 | 9/1990 | European Pat. Off. . |
| 0 668 324 | 8/1995 | European Pat. Off. . |
| 0 710 702 | 5/1996 | European Pat. Off. . |
| 0 718 368 | 6/1996 | European Pat. Off. . |
| 0 738 760 | 10/1996 | European Pat. Off. . |
| 0 791 664 | 8/1997 | European Pat. Off. . |
| 4314737 | 11/1994 | Germany . |
| 4314738 | 11/1994 | Germany . |
| 4323181 | 1/1995 | Germany . |
| 4323121 | 2/1995 | Germany . |
| 4428737 | 2/1996 | Germany . |
| 44 40010 | 5/1996 | Germany . |
| 55-082130 | 6/1980 | Japan . |
| 60-038465 | 2/1985 | Japan . |
| 63-275667 | 11/1988 | Japan . |
| 9605252 | 2/1996 | WIPO . |

OTHER PUBLICATIONS

Cheung M F et al., "Tensile Fracture Morphology of Polysulfone–Poly(Phenylene Sulfide)Blends", Polymer Bulletin Bd. 26, Nr. 3, Aug. 1, 1991 pp. 349–356.

*Primary Examiner*—Frederick Krass
*Attorney, Agent, or Firm*—Connolly & Hutz

[57] ABSTRACT

Polymer mixtures which comprise at least one thermoplastic and at least one oxidized polyarylene sulfide show particularly good tribological behaviour. The thermoplastics of the mixture are, for example, polyacetal, polyester, liquid-crystalline polymer, polyaryl ether ketone, polysulfone, polyether sulfone, polyphenylene sulfide or polyether imide. The oxidized polyarylene sulfide is preferably polyphenylene sulfone. The polymer mixtures are used for producing gear wheels, gear racks, bearings, chains, pulleys, rollers, wheels or gasket materials.

17 Claims, No Drawings

MIXTURES OF THERMOPLASTICS AND OXIDIZED POLYARLENE SULFIDES

The invention relates to mixtures of thermoplastics and oxidized polyarylene sulfides, in particular polyarylene sulfones or partially oxidized polyarylene sulfides which contain S, SO or $SO_2$ bridges, and to the use of such mixtures for producing shaped plastic articles.

Thermoplastics have been known for a long time and are distinguished by their ease of conversion into moldings. The broad range of properties exhibited by this class of materials makes them ideal for a large number of applications. The tribological behavior and the creep tendency of this group of materials are, however, often disadvantageous.

To improve the tribological properties of thermoplastics, polyester compounds, polyether ether ketones, polyether imides or polyimides have been used as additives, but these frequently bring disadvantages:

1. The additives may decompose at the processing temperatures of high-temperature thermoplastics,
2. poor grindability of the additives causes inhomogeneous distribution in the thermoplastic and
3. the chemical resistance and heat resistance of the thermoplastics are to some extent reduced by the additives.

DE 43 23 181 A1 and DE 43 23 121 A1 describe mixtures of fluoropolymers and oxidized polyarylene sulfides in which the abrasion characteristics of the fluoropolymers are improved by the addition of oxidized polyarylene sulfides.

The object of the invention was therefore to mitigate the abovementioned disadvantages of thermoplastics.

The invention relates to a polymer mixture comprising
A) from 40 to 99.5% by weight of at least one thermoplastic,
B) from 0.5 to 60% by weight of at least one oxidized polyarylene sulfide and
C) if desired, other conventional additives.

The % by weight values are based on the total weight of the polymer mixture. The proportion of the thermoplastic in the polymer mixture is in general from 40 to 99.5% by weight, preferably from 70 to 99% by weight, in particular from 90 to 99% by weight. The proportion of the oxidized polyarylene sulfide in the polymer mixture is in general from 0.5 to 60% by weight, preferably from 1 to 30% by weight, in particular from 1 to 10% by weight. All of the above % by weight values are based on the total weight of the polymer mixture.

It has been found that the addition of oxidized polyarylene sulfides, in particular of polyarylene sulfones, to thermoplastics improves the tribological behavior of these thermoplastics. This is surprising, since thermoplastics have physical and chemical characteristics which are completely different from those of fluoropolymers. For example, thermoplastics are hard materials which can be shaped and processed only at elevated temperatures, whereas fluoropolymers are soft, flowable materials. A significant difference between thermoplastics and fluoropolymers is that fluoropolymers are polymers in which a significant part or all of the hydrogen has been replaced by fluorine.

Surprisingly, it has also been found that the addition of oxidized polyarylene sulfides to liquid-crystalline thermoplastics improves the tribological behavior and mechanical strength of these thermoplastics. The content of liquid-crystalline thermoplastics is preferably from 1 to 30% by weight.

The term thermoplastics is taken to mean polymers which have a melting point or are processable by thermoplastic processes. They are well known and are described, for example, in Ullmann's Encyclopedia of Industrial Chemistry, VCH Verlagsgesellschaft mbH, Weinheim-New York, which is incorporated herein by way of reference. Examples are polyacrylamides and polyacrylic acids, Volume A21, p. 143–156; polyacrylates, Volume A21, p. 157–178; polyamides, Volume A21, p. 179–206; polycarbonates, Volume A21, p. 207–216; polyesters, Volume A21, p. 227–252; polyimides, Volume A21, p. 253–273; polymer blends, Volume A21, p. 274–305; electrically conductive polymers, Volume A21, p. 429–448; high-temperature polymers, Volume A21, p. 449–472; polymethyl methacrylates, Volume A21, p. 473–486; polyolefins, Volume A21, p. 487–578; polyoxyalkylenes, Volume A21, p. 579–590; polyacetals, Volume A21, p. 591–604; polyphenylene oxides, Volume A21, p. 605–614; polystyrenes and styrene copolymers, Volume A21, p. 615–664; polyurethanes, Volume A21, p. 665–716; polyvinyl chlorides, Volume A21, p. 717–742; polyvinyl compounds, Volume A21, p. 743–758; polyvinyl esters, Volume A22, p. 1–10; polyvinyl ethers, Volume A22, p. 11–16; polyvinylidene chlorides, Volume A22, p. 17–30 and silicones, Volume A24, p. 57–94. Other thermoplastics are described in Kunststoff-Handbuch [Plastics Handbook] Vol. 3—3, G. W. Becker and D. Braun (Eds.), Carl Hanser Verlag, Munich 1994, for example liquid-crystalline polymers, p. 219–258, polyaryl ether ketones, p. 359–385, polyether imides, p. 297–335, and polysulfones and polyether sulfones, p. 141–217. The term thermoplastic also includes mixtures or blends of thermoplastics.

Polyarylene sulfides and their preparation are described in Ullmann's Encyclopedia of Industrial Chemistry, Volume A21, B. Elvers, S. Hawkins and G. Schulz (Eds.), VCH, Weinheim-New York 1992, p. 463–472, which is incorporated herein by way of reference. The synthesis of polyarylene sulfides containing sulfone groups is described in Chimia 28(9) (1974), 567, which is likewise incorporated herein by way of reference.

Oxidized polyarylene sulfides are linear and branched polyarylene sulfides (—Ar—S—, Ar=arylene) some or all of whose sulfur groups have been converted into sulfoxide and/or sulfone groups. Oxidized polyarylene sulfides and their preparation are described in German Patent Applications DE 43 14 737 and DE 43 14 738, which are incorporated herein by way of reference. For the purposes of the invention, oxidized polyarylene sulfides are polyarylene sulfones, polyarylene sulfoxide sulfones, polyarylene sulfide sulfones and polyarylene sulfide sulfoxide sulfones, where in general at least 10%, preferably at least 30% and particularly preferably at least 60% of the sulfur bridges have been converted into sulfone bridges. The preferred arylene is phenylene.

Oxidized polyarylene sulfides are particularly heat resistant and are very stable under the conditions of thermoplastic processing. The oxidized polyarylene sulfides behave as fillers in the thermoplastics. The mean particle size ($d_{50}$ value) of the oxidized polyarylene sulfides (B) according to the invention is generally in the range from 0.3 to 500 $\mu$m, preferably from 1 to 300 $\mu$m and in particular from 5 to 50 $\mu$m.

The novel mixtures are prepared from the individual components by standard methods and in mixers suitable for this purpose, then processed by known processes (e.g. compounding, injection molding, hot pressing, extrusion or blow molding).

The novel mixtures can include, as component C), conventional additives, such as thermal stabilizers, UV stabilizers, antistats, flame retardants, dyes, pigments, inorganic and/or organic fillers and lubricants, such as molybdenum disulfide, graphite or polytetrafluoroethylene.

The addition of lubricants to the mixtures reduces the coefficient of friction. The combination of low abrasion and low coefficient of friction is often advantageous.

The mixtures are advantageously employed as materials for applications which demand low abrasion and low creep, such as sliding bearings or materials for gaskets. Low-abrasion fibers and films can also be produced from these materials.

The mixtures are suitable for producing shaped plastic articles, such as gear wheels, gear racks, bearings, chains, pulleys, rollers, wheels and gaskets.

EXAMPLES

Preparation of polyphenylene sulfone ($PPSO_2$):

63 kg of polyphenylene sulfide powder ($d_{50}$ value: 20 $\mu$m) having a $T_g$ of 94° C. and a $T_m$ of 290° C., in 219 l of glacial acetic acid at 50° C., were precharged, 1.2 l of conc. sulfuric acid were added, and 91 kg of hydrogen peroxide (50%) were added dropwise over 3 h, during which the temperature increased to 60°–65° C. After continued stirring for 2 h at 65° C. and for 1 h at 80° C., the reaction solution was cooled, filtered with suction at 50° C., washed with water and dried.

Yield: 70 kg.; DSC data: $T_g$: 352° C., $T_m$: 520° C. (decomposition); Elemental analysis: $(C_6H_4SO_2)_n$; C: 55.6%, H: 3.2%, S: 24.6%, O: 16.0%.

This corresponds to a degree of sulfur oxidation in the polymer of about 65%.

The $PPSO_2$ prepared in this way was employed as component B) in Examples 1 to 8.

The mixture components thermoplastic (A) and polyphenylene sulfone (B) were, if necessary, dried under reduced pressure at 120° C. under a gentle stream of nitrogen. The dry mixture components were charged into a twin-screw extruder (type LSM 30.34, Leistritz GmbH, Nuremberg, Germany), mixture component (A) was melted and mixed with (B). The mixture was then cooled in a water bath, granulated and dried. From the granules, test specimens according to DIN 16 770 were produced on an injection-molding machine (type KM090/0210B, Krauss-Maffei, Munich, Germany). Measurement of property values according to DIN/ISO was carried out on the test specimens immediately after their production.

In Example 1, abrasion was determined using an abrasion shaft (Hoechst internal method) and the coefficient of friction was determined on a UTI test rig (test procedure: Uhren-Technisches-Institut UTI).

In determining abrasion using the abrasion shaft, a test specimen (diameter: 12.2 mm; depth: 18 mm) is pressed with a force of 3.1N against a steel shaft (diameter: 65 mm; surface roughness $R_z$: 0.7 $\mu$m). The shaft rotates with a circumferential speed of 136 m/min. The test lasted 60 h (490 km), after which the abraded material was measured by weighing.

In determining the coefficient of friction by the UTI method, a steel ball (diameter: 13 mm, surface roughness $R_z$: 0.1 $\mu$m) is pressed with a force of 6N against a test specimen (length: 20 mm, width: 10 mm, thickness: 4 mm) which is in reciprocal motion at a velocity of 0.6 m/min. The coefficient of friction is measured on-line over a period of 8 h, and the mean value is calculated.

The tribological results in Examples 2–8 were determined on a pin and disk test rig, in which a test pin is fixed in a holder at the lower end of a bar, on carrying strain gauges to measure the perpendicular and frictional forces. The weights which produce the perpendicular force are secured to the upper end of the bar. The test pin is pressed perpendicularly onto a rotating abrasion disk made from hardened steel (100 Cr 6, Rockwell hardness HRC>50). The surface roughness of the abrasion disk is measured before each test. The velocity of the disk is kept constant. The plastic pin, together with the bar, moves downward as a result of wear to its abrading surface. The downward movement is measured by an inductive displacement sensor. The measurements are collected on-line, and can be evaluated with a computer.

1. Mixtures of polyoxymethylene (POM) and $PPSO_2$:

The POM used was ®Hostaform C9021 (Hoechst AG, Frankfurt a.M., Germany, in granule form). Product properties and processing instructions are documented in the "Hostaform" datasheet from Hoechst AG. In addition, Hostaflon TFX 9201, a polytetrafluoroethylene from Hoechst AG, Frankfurt a.M., Germany, was used as lubricant. The latter is a micropowder (primary particle size: about 4 $\mu$m, secondary particle size: about 200 nm) with an MVI (372° C./2.16 kg)>0.1 g/10 min.

Process parameters:

Extruder: Melt temperature: 190° C.

Injection-molding machine: Melt temperature: 190°–200° C.

Mold wall temperature: 120° C.

Property values:

|  | 100% Hostaform C 9021 | 90% Hostaform C 9021 10% $PPSO_2$ | 80% Hostaform C 9021 10% $PPSO_2$ 10% Hostaflon TFX 9201 |
|---|---|---|---|
| Abrasion (K factor)* [$10^{-6}$ mm$^3$/Nm] | 7.5 | 1.8 | 1.3 |
| Coefficient of friction* [–] | 0.34 | 0.41 | 0.28 |

*Sliding velocity: 0.5 m/s, contact pressure: 1 N/mm$^2$, surface roughness ($R_z$) = 1 $\mu$m 2. Mixtures of polybutylene terephthalate (PBT) and $PPSO_2$:

The PBT used (in granule form) had an MVI (250° C./2.16 kg) of 38 cm$^3$/10 min.

Process parameters:

Extruder: Melt temperature: 250°–260° C.

Injection-molding machine: Melt temperature: 250°–260° C.

Mold wall temperature: 80° C.

Property values:

|  | 100% PBT | 95% PBT 5% $PPSO_2$ | 90% PBT 10% $PPSO_2$ |
|---|---|---|---|
| Abrasion (K factor)* [$10^{-6}$ mm$^3$/Nm] | 5.4 | 3.6 | 0.7 |

*Sliding velocity: 0.5 m/s, contact pressure: 1 N/mm$^2$, surface roughness ($R_z$) = 1 $\mu$m 3. Mixtures of polysulfone (PSU) and $PPSO_2$:

The PSU used was ®Udel P-1700 (Amoco Chemical Deutschland GmbH, Düsseldorf, Germany, in granule form). Product properties and processing instructions are documented in the Amoco datasheet "Amoco Performance Products".

Process parameters:

Extruder: Melt temperature: 360°–370° C.

Injection-molding machine: Melt temperature: 360° C.

Mold wall temperature: 130° C.

Property values:

|  | 100% Udel P-1700 | 95% Udel P-1700 5% PPSO$_2$ | 90% Udel P-1700 10% PPSO$_2$ | 85% Udel P-1700 15% PPSO$_2$ |
|---|---|---|---|---|
| Abrasion (K factor)* [10$^{-6}$ mm$^3$/Nm] | 243 | 144 | 333 | 367 |
| Coefficient of friction* [–] | 0.49 | 0.47 | 0.43 | 0.32 |

*Sliding velocity: 0.5 m/s, contact pressure: 1 N/mm$^2$, surface roughness (R$_z$) = 2 μm 4. Mixtures of polyether sulfone (PES) and PPSO$_2$:

The PES used was Radel A-200 (Amoco Chemical Deutschland GmbH, Düsseldorf, Germany, in granule form). Product properties and processing instructions are documented in the Amoco datasheet "Amoco Performance Products".

Process parameters:

Extruder: Melt temperature: 360°–370° C.

Injection-molding machine: Melt temperature: 360°–370° C.

Mold wall temperature: 150° C.

Property values:

|  | 100% Radel A-200 | 95% Radel A-200 5% PPSO$_2$ | 90% Radel A-200 10% PPSO$_2$ | 85% Radel A-200 15% PPSO$_2$ |
|---|---|---|---|---|
| Abrasion (K factor)* [10$^{-6}$ mm$^3$/Nm] | 639 | 159 | 295 | 503 |
| Coefficient of friction* [–] | 0.48 | 0.33 | 0.45 | 0.4 |

*Sliding velocity: 0.5 m/s, contact pressure: 1 N/mm$^2$, surface roughness (R$_z$) = 0.5 μm 5. Mixtures of liquid-crystalline polyesters (LCP) and PPSO$_2$:

The LCP used was ®Vectra A950 (Hoechst AG, Frankfurt a.M., Germany, in granule form). Product properties and processing instructions are documented in the Hoechst AG datasheet "Vectra".

Process parameters:

Extruder: Melt temperature: 290°–300° C.

Injection-molding machine: Melt temperature: 290°–300° C.

Mold wall temperature: 120° C.

Property values:

|  | 100% Vectra A950 | 95% Vectra A950 5% PPSO$_2$ | 90% Vectra A950 10% PPSO$_2$ | 85% Vectra A950 15% PPSO$_2$ |
|---|---|---|---|---|
| Tribology |  |  |  |  |
| Abrasion (K factor)* [10$^{-6}$ mm$^3$/Nm] | 0.39 | 0.24 | 0.35 | 0.78 |
| Coefficient of friction* [–] | 0.64 | 0.39 | 0.17 | 0.24 |
| Tensile test ISO 527 |  |  |  |  |
| Tensile modulus of elasticity [N/mm$^2$] | 8600 | 8110 | 7510 | 7200 |
| Tensile strength [N/mm$^2$] | 153 | 174 | 157 | 146 |
| Elongation at break [%] | 4.2 | 5.3 | 5.2 | 5 |
| Compressive test ISO 604 |  |  |  |  |
| Yield stress [N/mm$^2$] | 67.7 | 68.6 | 69.1 | 76.1 |
| Compression at yield stress [%] | 9.5 | 10.6 | 6.6 | 18.2 |

*Sliding velocity: 0.5 m/s, contact pressure: 1 N/mm$^2$, surface roughness (R$_z$) = 3 μm 6. Mixtures of polyphenylene sulfide (PPS) and PPSO$_2$:

A PPS reinforced with 40% by weight of glass fibers was used (®Fortron 1140 L4 (Hoechst AG, Frankfurt a.M., Germany, in granule form). Product properties and processing instructions are documented in the Hoechst datasheet "Fortron".

Process parameters:

Extruder: Melt temperature: 310°–320° C.

Injection-molding machine: Melt temperature: 320°–330° C.

Mold wall temperature: 140° C.

Property values:

|  | 100% Fortron 1140L4 | 95% Fortron 1140L4 5% PPSO$_2$ | 90% Fortron 1140L4 10% PPSO$_2$ | 85% Fortron 1140L4 15% PPSO$_2$ |
|---|---|---|---|---|
| Abrasion (K Factor)* [10$^{-6}$ mm$^3$/Nm] | 2.13 | 1.11 | 1.62 | 1.44 |
| Coefficient of friction* [–] | 0.26 | 0.3 | 0.47 | 0.31 |

|  | 95% Fortron 1140L4 5% PPSO$_2$ | 90% Fortron 1140L4 5% PPSO$_2$ 5% Natural graphite UF4 | 90% Fortron 1140L4 5% PPSO$_2$ 3.3% Natural graphite UF4 1.7% Molyform M 15 |
|---|---|---|---|
| Abrasion (K Factor)* [10$^{-6}$ mm$^3$/Nm] | 1.11 | 1.33 | 1.42 |
| Coefficient of friction* [–] | 0.3 | 0.34 | 0.23 |

*Sliding velocity: 0.5 m/s, contact pressure: 1 N mm$^2$, surface roughness (R$_z$) = 3 μm 7. Mixtures of polyether imide (PEI) and PPSO$_2$:

The PEI used was ®Ultem 1000 (General Electric Plastics GmbH, Rüsselsheim, Germany, in granule form). Product properties and processing instructions are documented in the General Electric datasheet "Ultem".

Process parameters:
Extruder: Melt temperature: 360°–370° C.
Injection-molding machine: Melt temperature: 370°–380° C.
Mold wall temperature: 120° C.

Property values:

|  | 100% Ultem 1000 | 95% Ultem 1000 5% PPSO$_2$ | 90% Ultem 1000 10% PPSO$_2$ | 85% Ultem 1000 15% PPSO$_2$ |
|---|---|---|---|---|
| Abrasion (K Factor)* [10$^{-6}$ mm$^3$/Nm] | 297 | 97 | 216 | 229 |
| Coefficient of friction* [–] | 0.18 | 0.33 | 0.21 | 0.21 |

*Sliding velocity: 0.5 m/s, contact pressure: 1 N/mm$^2$, surface roughness (R$_z$) = 0.5 μm

|  | 90% Ultem 1000 5% PPSO$_2$ 5% Natural graphite UF4 | 90% Ultem 1000 5% PPSO$_2$ 5% Molyform M 15 | 90% Ultem 1000 5% PPSO$_2$ 3.3% Natural graphite UF4 1.7% Molyform M 15 |
|---|---|---|---|
| Abrasion (K Factor)* [10$^{-6}$ mm$^3$/Nm] | 142 | 125 | 165 |
| Coefficient of friction* [–] | 0.33 | 0.37 | 0.14 |

*Sliding velocity: 0.5 m/s, contact pressure: 1 N/mm$^2$, surface roughness (R$_z$) = 0.75 μm 8. Mixtures of polyether ether ketone (PEEK) and PPSO$_2$:

The PEEK used was PEEK 450G (®Victrex Deutschland GmbH, Hofheim, Germany, in granule form). Product properties and processing instructions are in the datasheet "Victrex PEEK" from ICI Materials, Middlesbrough, England.

Process parameters:
Extruder: Melt temperature: 370°–380° C.
Injection-molding machine: Melt temperature: 370°–380° C.
Mold wall temperature: 180° C.

Property values:

|  | 100% PEEK 450G | 95% PEEK 450G 5% PPSO$_2$ | 90% PEEK 450G 10% PPSO$_2$ | 85% PEEK 450G 15% PPSO$_2$ |
|---|---|---|---|---|
| Abrasion (K Factor)* [10$^{-6}$ mm$^3$/Nm] | 5.7 | 4.4 | 3.7 | 3.7 |
| Coefficient of friction* [–] | 0.52 | 0.4 | 0.32 | 0.43 |

*Sliding velocity: 0.5 m/s, contact pressure: 1 N/mm$^2$, surface roughness (R$_z$) = 0.5 μm

What is claimed is:

1. A polymer mixture comprising:
   A. from 40 to 99.5% by weight of at least one non-fluoropolymeric thermoplastic component, and, filled therewith,
   B. from 0.5 to 60% by weight of at least one particulate, oxidized polyarylene sulfide having oxidized sulfur bridges, in which at least 10% of the sulfur bridges have been converted into sulfone bridges, sulfoxide bridges, or combinations thereof,
where the percentages by weight of said components A and B are based upon the total weight of the polymer mixture, and wherein the polymer mixture is processable by thermoplastic processing and the oxidized PAS is inert under the processing conditions.

2. A polymer mixture as claimed in claim 1, wherein said component B comprises a linear or branched polyarylene sulfide in which at least 30% of the sulfur bridges have been converted to sulfoxide and/or sulfone bridges.

3. A polymer mixture as claimed in claim 1, wherein the thermoplastic comprises an olefin polymer in which the hydrogen of the olefin has not been replaced by fluorine.

4. polymer mixture as claimed in claim 1, which comprises from 70 to 99% by weight of component A) and from 1 to 30% by weight of component B).

5. A polymer mixture as claimed in claim 4, wherein the polymer mixture comprises from 90 to 99% by weight of component A) and from 1 to 10% by weight of component B).

6. A polymer mixture as claimed in claim 1, wherein the thermoplastic is polyacrylamide, polyacrylic acid, polyacrylate, polyacetal, polyamide, polycarbonate, polyester, polyimide, polyurethane, polymethyl methacrylate, polyoxyalkylene, polyoxymethylene, polyphenylene oxide, polystyrene, styrene copolymer, polyvinyl chloride, polyvinyl ester, polyvinyl ether, polyvinylidene chloride, silicone, liquid-crystalline polymer, polyaryl ether ketone, polysulfone, polyether sulfone, polyphenylene sulfide, polyether imide or a mixture or blend of two or more of these thermoplastics.

7. A polymer mixture as claimed in claim 6, wherein the thermoplastic is polyacetal, polyester, liquid-crystalline polymer, polyaryl ether ketone, polysulfone, polyether sulfone, polyphenylene sulfide, polyether imide or a mixture or blend of two or more of these thermoplastics.

8. A polymer mixture as claimed in claim 1, wherein at least 60% of the sulfur bridges have been converted into sulfone bridges.

9. A polymer mixture as claimed in claim 1, wherein the arylene of said polyarylene sulfide or said polyarylene sulfone is phenylene.

10. A polymer mixture as claimed in claim 1 wherein said component B) is particulate, and wherein the particle size value, d$_{50}$ of component B) is from 0.3 to 500 μm.

11. A polymer mixture as claimed in claim 10, wherein said particle size value of component B) is from 5 to 50 μm.

12. A polymer mixture as claimed in claim 1, wherein the polymer mixture includes from 1 to 30% by weight of oxidized polyarylene sulfide and the thermoplastic is a liquid-crystalline polymer.

13. A polymer mixture as claimed in claim 1, wherein the polymer mixture further comprises, thermal stabilizers, UV stabilizers, antistats, flame retardants, dyes, pigments or inorganic or organic fillers.

14. A polymer mixture as claimed in claim 1, wherein the polymer mixture includes lubricants.

15. A polymer mixture as claimed in claim 14, wherein the lubricant is molybdenum sulfide, graphite or polytetrafluoroethylene.

16. A shaped plastic article comprising a polymer mixture of claim 1 which has been shaped to form said article.

17. A shaped plastic article as claimed in claim 16, wherein said article is a wheel, a gear rack, a bearing, a chain, a pulley, a roller or a gasket.

* * * * *